United States Patent [19]

Mafoti

[11] Patent Number: 5,208,268

[45] Date of Patent: May 4, 1993

[54] INTERNAL RELEASE AGENTS, ACTIVE HYDROGEN CONTAINING MIXTURES WHICH CONTAIN SUCH AGENTS AND THE USE THEREOF IN A PROCESS FOR THE PRODUCTION OF MOLDED PRODUCTS

[75] Inventor: Robson Mafoti, Pittsburgh, Pa.

[73] Assignee: Miles Inc., Pittsburgh, Pa.

[21] Appl. No.: 951,685

[22] Filed: Sep. 25, 1992

[51] Int. Cl.$^5$ .............................................. C08G 18/14
[52] U.S. Cl. .................................. 521/115; 521/51;
524/714; 528/53; 264/51; 264/328.1;
264/328.6; 264/328.8; 560/155; 560/169;
106/2; 106/243; 252/51.5 R; 252/51.5 A;
252/182.14; 252/182.18
[58] Field of Search ................. 521/115, 51; 524/714;
528/53; 264/51, 328.1, 328.6, 328.8; 560/155,
169; 106/2, 243; 252/51.2 R, 51.5 A, 182.14,
182.18

[56] References Cited

U.S. PATENT DOCUMENTS

| | | | |
|---|---|---|---|
| 3,726,952 | 4/1973 | Boden et al. | 264/48 |
| 3,925,527 | 12/1975 | Kleimann et al. | 264/53 |
| 4,058,492 | 11/1977 | von Bonin et al. | 260/2.5 AM |
| 4,098,731 | 7/1978 | von Bonin et al. | 521/51 |
| 4,201,847 | 5/1980 | Kleimann et al. | 521/172 |
| 4,254,228 | 3/1981 | Kleimann et al. | 521/128 |
| 4,519,965 | 5/1985 | Taylor et al. | 264/51 |
| 4,581,386 | 4/1986 | Taylor et al. | 521/125 |
| 4,868,224 | 9/1989 | Harasin et al. | 521/124 |
| 4,954,537 | 9/1990 | Sanns, Jr. | 521/157 |

FOREIGN PATENT DOCUMENTS 1365215 8/1974 United Kingdom .

*Primary Examiner*—Maurice J. Welsh
*Attorney, Agent, or Firm*—Joseph C. Gil

[57] ABSTRACT

The present invention is directed to a novel internal release agent, a mixture of isocyanate reactive materials containing the release agent and a RIM process using the release agent. The novel release agent is the reaction product of i) an ester prepared by reacting a specific tetrol with a mixture of saturated and unsaturated acids, and ii) a neutralizing agent.

10 Claims, No Drawings

INTERNAL RELEASE AGENTS, ACTIVE HYDROGEN CONTAINING MIXTURES WHICH CONTAIN SUCH AGENTS AND THE USE THEREOF IN A PROCESS FOR THE PRODUCTION OF MOLDED PRODUCTS

BACKGROUND OF THE INVENTION

Internal mold release agents used in the production of molded polyurethane and polyurea products are known. Many of the known internal release agents are based at least in part on fatty acid esters. Typical of such release agents are those described in U.S. Pat. Nos. 3,726,952, 3,925,527, 4,058,492, 4,098,731, 4,201,847, 4,254,228, 4,868,224 and 4,954,537, and British Patent 1,365,215.

U.S. Pat. Nos. 4,519,965 and 4,581,386 describe the use of zinc carboxylates as internal mold release agents for the production of molded polyurethane and/or polyurea elastomers.

Recently novel release agents have been developed which comprise an ester having an acid number of 15 or less, and preferably 10 or less, prepared by reacting (a) one mole of a tetrahydroxy compound prepared by reacting one mole of a $C_2$ to $C_8$ alkylene diamine, preferably a $C_2$ or $C_3$ alkylene diamine, with from 4 to 12 moles, and preferably 4 to 6 moles, of an alkylene oxide, with (b) four moles of an acid mixture consisting of at least one saturated monocarboxylic acid and at least one unsaturated monocarboxylic acid, with the molar ratio of saturated to unsaturated acid being from 1:1 to 3:1, and preferably 1:1. See, U.S. patent application Ser. No. 697,153, filed May 8, 1991 and now U.S. Pat. No. 5,158,607. These release agents tend to be acidic in nature and speed up the reaction between isocyanates and amine groups making it difficult to process polyurea systems.

DESCRIPTION OF THE INVENTION

The present invention is directed to a novel internal mold release agent, an active hydrogen containing mixture which contains such agent, and the use thereof in a reaction injection molding ("RIM") process. The novel release agents herein comprise the reaction product of i) an ester having an acid number of 15 or less, and preferably 10 or less, prepared by reacting (a) one mole of a tetrahydroxy compound prepared by reacting one mole of a $C_2$ to $C_8$ alkylene diamine, preferably a $C_2$ or $C_3$ alkylene diamine, with from 4 to 12 moles, and preferably 4 to 6 moles, of an alkylene oxide, with (b) four moles of an acid mixture consisting of at least one saturated monocarboxylic acid and at least one unsaturated monocarboxylic acid, with the molar ratio of saturated to unsaturated acid being from 1:1 to 3:1, and preferably 1:1, and ii) a neutralizing amount of a neutralizing agent selected from the group consisting of sodium bicarbonate, cesium bicarbonate, and zinc oxide, said reaction product having an acid number of 1 or less.

It has been found that the product gives excellent release from a variety of different mold surfaces. Excellent release occurs when the mold surface has been pre-sprayed with an external release agent. It has also been found that release from a bare metal mold, such as steel or aluminum, is possible without any pre-application of external mold release agent to the mold surface. Finally, the preferred release agents herein are compatible with active hydrogen containing mixtures which are typically used in the preparation of polyurea-based reaction injection molded ("RIM") parts.

The esters useful herein have acid numbers of 15 or less, and preferably 10 or less, and are prepared by reacting certain tetrahydroxy compounds with specific acid mixtures. The amines used to prepare the tetrahydroxy compounds are alkylene diamines of the formula.

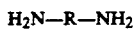

$$H_2N-R-NH_2$$

where R is a $C_2$ to $C_8$ straight or branched chain alkylene group. Useful diamines include ethylene diamine and the various straight and branched chain isomers of diaminopropane, diaminobutane, diaminopentane, diaminohexane, diaminoheptane, and diaminooctane. Specific useful diamines include 1,2- and 1,3-diaminopropane; 1,3-, 2,3-, and 1,4-diaminobutane; 1,2-diamino-2-methyl propane; 1,5-diaminopentane; 1,4-diamino-1-methylbutane; 1,4-diamino-2-methylbutane; 1,3-diamino-1-ethylpropane; 1,3-diamino-1,1-dimethylpropane; 1,3-diamino-1,2-dimethylpropane; 1,3-diamino-2,2-dimethylpropane; 1,5-diamino-2-methylpentane; 1,6-diaminohexane and the like. It is presently preferred to use ethylene diamine.

The tetrahydroxy compounds useful herein are known and are prepared by reacting the above noted diamines with alkylene oxides such as ethylene and propylene oxide. Propylene oxide is the presently preferred alkylene oxide. In general, the tetrahydroxy compounds are prepared by reacting one mole of the diamine with from 4 to 12 moles, preferably from 4 to 6 moles, of the alkylene oxide. It is generally preferred to use the minimum amount of alkylene oxide needed to react with all the hydrogens attached to the nitrogen atoms since it is particularly desirable to maximize the weight of the acid portion of the ester in the release agent herein. Accordingly, it is most preferred to use only four or five moles of the alkylene oxide.

The tetrahydroxy compounds are then reacted with a mixture of saturated and unsaturated monocarboxylic acids. In general, the preferred saturated monocarboxylic acids are those containing one or more alkyl groups of from 4 to 22 carbon atoms. Most preferred are saturated aliphatic fatty monocarboxylic acids such as stearic acid, isostearic acid, palmitic acid, undecanoic acid, neodecanoic acid, caproic acid, capric acid, myristic acid, pentanoic acid, heptanoic acid, caprylic acid, nonanoic acid, dodecanoic acid, tridecanoic acid, 2-methylbutanoic acid, pivalic acid, 2-ethylhexanoic acid and the like. Stearic acid is the presently preferred saturated monocarboxylic acid.

In general, the preferred unsaturated monocarboxylic acids are those containing one or more alkyl groups of from 4 to 22 carbon atoms. Most preferred are unsaturated aliphatic fatty monocarboxylic acids such as palmitoleic acid, 10-undecenoic acid, 4-decenoic acid, caproleic acid, myristoleic acid, 5-tetradecenoic acid, lauroleic acid, oleic acid, erucic acid and the like. Oleic acid is the presently preferred unsaturated monocarboxylic acid.

The acids may be reacted with the tetrahydroxy compound sequentially or, preferably, as a mixture of the two acids. The reaction of the monocarboxylic acids with the tetrahydroxy compound is generally carried out at temperatures of from 40° to 220° C., preferably from 100° to 215° C., under excess pressure, reduced pressure, or, preferably in the substantial absence of pressure. A catalyst may be added after the water stops distilling over, with dibutyl tin oxide being the preferred catalyst. While the reaction time is dependent upon the nature and amounts of starting materials, reaction times of from 2 to 8 hours are generally sufficient. The reaction is considered complete when the acid number is less than 15 and preferably less than 10.

General techniques for the preparation of the esters of the type useful herein are generally known and are described in U.S. Pat. Nos. 4,201,847, 4,254,228, and 3,925,527, the disclosures of which are herein incorporated by reference.

The esters are then neutralized by addition of a neutralizing amount of a neutralizing agent selected from the group consisting of sodium bicarbonate, cesium bicarbonate, and zinc oxide. The amount of neutralizing agent generally ranges from 0.1 to 6.0 parts, and preferably from 0.4 to 4.0 parts per weight per 100 parts by weight of the ester. In general, the ester is charged into a reactor and the neutralizing agent is added with stirring. The temperature is raised to 100° to 200° C., and preferably to 110° to 180° C., and most preferably to about 160° C. The reaction is continued under vacuum to remove the water formed. At the end of the reaction (typically after from 30 to 90 minutes), the acid number which must be 1 or less is measured.

The release agents of the present invention are eminently suitable for use in the RIM process. As is known, in the RIM process, an isocyanate, and active hydrogen containing compounds are mixed and injected into molds, where the reactants are allowed to react fully.

Starting polyisocyanate components for use in the RIM process include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of useful ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers. Additional examples include 1-isocyanato-3,3,5-trimethyl-5-isocyanatomethyl cyclohexane (German Auslegeschrift 1,202,785 and U.S. Pat. No. 3,401,190), 2,4- and 2,6-hexahydrotolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 1,4- and 2,6-tolylene diisocyanate and mixtures of these isomers are also suitable in the instant invention. Diphenylmethane-2,4- and/or -4,4'-diisocyanate; naphthylene-1,5-diisocyanate; triphenyl methane-4,4',4''-triisocyanate; polyphenyl polymethylene polyisocyanates of the type obtained by condensing aniline with formaldehyde, followed by phosgenation and described, for example, in British Patents 874,430 and 848,671 may also be used in the present invention; m- and p-isocyanato-phenyl-sulfonyl isocyanates according to U.S. Pat. No. 3,454,606; perchlorinated aryl polyisocyanates of the type described, for example, in German Auslegeschrift 1,157,601 (U.S. Pat. No. 3,277,138); polyisocyanates containing carbodiimide groups of the type described in German Patent 1,902,007 (U.S. Pat. No. 3,152,162); diisocyanates of the type described in U.S. Pat. No. 3,492,330; and polyisocyanates containing allophanate groups of the type described, for example, in British Patent 993,890, in Belgian Patent 761,626 and in published Dutch Application 7,102,524 are still further examples of suitable isocyanates. Additionally, polyisocyanates containing isocyanurate groups of the type described, for example, in U.S. Pat. No. 3,001,973; in German Patents 1,022,789; 1,222,067 and 1,027,394 and in German Offenlegungsschriften 1,929,034 and 2,004,408; polyisocyanates containing urethane groups of the type described, for example, in Belgian Patent 752,261 or in U.S. Pat. No. 3,394,164; polyisocyanates containing acylated urea groups according to German Patent 1,230,778 and polyisocyanates containing biuret groups of the type described, for example, in German Patent 1,101,394 (U.S. Pat. Nos. 3,124,605 and 3,201,372) and in British Patent 889,050 are also suitable.

Polyisocyanates produced by telomerization reactions of the type described, for example, in U.S. Pat. No. 3,654,106; polyisocyanates containing ester groups of the type described for example, in British Patents 965,474 and 1,072,956, in U.S. Pat. No. 3,567,763 and in German Patent 1,231,688; reaction products of the above-mentioned isocyanates with acetals according to German Patent 1,072,385 and polyisocyanates containing polymeric fatty acid residues, according to U.S. Pat. No. 3,455,883 are still further examples of suitable isocyanate.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Patent 1,618,380 (U.S. Pat. No. 3,644,457). These may be produced for example, by reacting 1 mol of 4,4'-diisocyanatodiphenylmethane with from 0.05 to 0.3 moles of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent 1,092,007 (U.S. Pat. No. 3,152,162). Mixtures of these preferred polyisocyanates can also be used. In general, aliphatic and cycloaliphatic isocyanates are less suitable for the purposes of the instant invention.

Also preferred are the polyphenyl-polymethylene polyisocyanates obtained by the phosgenation of an aniline/formaldehyde condensate.

Also necessary for preparing molded products via the RIM process are isocyanate reactive components. These components may be typically divided into two groups, high molecular weight compounds having a molecular weight of 400 to about 10,000 and low molecular weight compounds, i.e. chain extenders, having a molecular weight of 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32-42 and 44-54, and Volume II, 1964, pages 5-6 and 198-199; and in Kunststoff-Handbuch, Vol. VII, Vieweg-Hochtlen, Carl Hanser Verlag, Munich, 1966, pages 45-71.

Suitable aminopolyethers which may be used in accordance with the present invention (and which are essential in preparing so-called polyurea RIM parts) as high molecular weight compounds (the molecular weight is always the average molecular weight which may be calculated from the functionality and the content of isocyanate-reactive groups) are those wherein at least about 30 and preferably about 60 to 100 equivalent % of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (Belgian Patent 634,741). U.S. Pat. No. 3,654,370 describes the production of polyoxyalkylene polyamines by reaction of the corresponding polyol with ammonia and hydrogen in the presence of a nickel, copper, chromium catalyst. German Patent 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728 and 3,236,895 and French Patent 1,551,605. The production of polyethers containing terminal secondary amino groups is described, for example, in French Patent 1,466,708.

Polyhydroxypolyethers of relatively high molecular weight may be converted into the corresponding anthranilic acid esters by reaction with isatoic acid anhydride, as described, for example, in German Offenlegungsschriften 2,019,432 and 2,619,840 and in U.S. Pat. Nos. 3,808,250, 3,975,428 and 4,016,143. Polyethers containing terminal aromatic amino groups are formed in this way.

According to German Offenlegungsschrift 2,546,536 and U.S. Pat. No. 3,865,791, relatively high molecular weight compounds containing terminal amino groups are obtained by reaction of NCO prepolymers based on polyhydroxypolyethers with enamines, aldimines or ketimines containing hydroxyl groups and subsequent hydrolysis.

It is preferred to use amino polyethers obtained by hydrolysis of compounds containing terminal isocyanate groups, for example in accordance with German Offenlegungsschrift 2,948,419 or U.S. Pat. No. 4,515,923, herein incorporated by reference in its entirety. In this process, polyethers most preferably containing 2 to 4 hydroxyl groups are reacted with polyisocyanates to form NCO prepolymers and, in a second step, the isocyanate groups are converted by hydrolysis into amino groups.

Also useful are amino compounds prepared by reacting the corresponding polyol with a halogenated nitrobenzene compound such as o- or p-nitrochlorobenzene, followed by the reduction of the nitro group(s) to the amine as described in U.S. application Ser. No. 183,556, filed on Apr. 19, 1988, now abandoned, and in published European Application 0,268,849, published Jun. 1, 1988. Also useful are amino terminated polyethers prepared by the reaction of amines with acetoacetylated polyethers as described in U.S. application Ser. Nos. 07/523,769 and 07/699,529, filed on May 15, 1990 and May 14, 1991, respectively, and U.S. Pat. No. 5,066,824. The "aminopolyethers" used in accordance with the invention are often mixtures of the compounds mentioned by way of example and (on a statistical average) most preferably contain 2 to 4 terminal isocyanate-reactive groups. In the process according to the invention, the "aminopolyethers" may be used in admixture with polyhydroxypolyethers free from amino groups.

In accordance with the present invention, the high molecular weight compounds can be used in admixture with up to about 95% by weight based on the total quantity of active hydrogen containing compounds, of low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Preferred chain extenders are amine terminated chain extenders. Suitable amine chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5-diethyl 2,4-diamino benzene, 1-methyl-3,5-diethyl-2,6-diamino benzene, 1,3,5-trimethyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene and mixtures of the above diamines. Most preferred are mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diaminodiphenylmethane, 1,2- and 1,4-phenylene diamine, naphthalene-1,5-diamine and triphenylmethane-4,4',4"-triamine. The difunctional and polyfunctional aromatic amine compounds may also exclusively or partly contain secondary amino groups such as 4,4'-di-(methylamino)-diphenylmethane or 1-methyl-2-methylamino-4-amino-benzene. Liquid mixtures of polyphenyl polymethylene-polyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

Other additives which may be used in the RIM process according to the present invention include catalysts, especially tin(II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diazabicyclo -(2,2,2)-octane (triethylene diamine), especially mixtures of these catalysts. The catalysts are generally used in amounts of about 0.01 to 10%, preferably about 0.05 to 2%, based on the weight of the isocyanate reactive component. In some instances, such as where the compatibilizer contains tertiary amine groups, no additional catalyst may be necessary.

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers. In addition, other known internal mold release agents may be blended with the reaction products herein. In most cases, and except for the instance where zinc carboxylates are mixed with the reaction products, it is preferred to use the reaction products alone without the addition of any other internal mold release agent.

The molded products of the present invention are prepared by reacting the components in a closed mold. The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the polyisocyanate component, while the second stream contains the isocyanate reactive components and any other additive which is to be included. According to the present invention, the internal release agent is added to the isocyanate reactive components. The release agents herein are generally used in amounts ranging from about 4% to about 12% by weight, based on the weight of all the isocyanate reactive components. This amount of release agent should be used even if mixtures of reaction product of polyester and monocarboxylic acid and zinc carboxylate are used.

The invention is further illustrated but is not intended to be limited by the following examples in which all parts and percentages are by weight unless otherwise specified.

EXAMPLES

A twelve liter flask was charged with 2181 parts of a tetrol (the tetrol was a commercially available material sold as Multranol 4050 from Miles Inc.; Multranol 4050 is a reaction product of ethylene diamine and propylene oxide having an OH number of about 630). Nitrogen was bubbled through the flask and the temperature was raised to 130° C. 3484 parts of stearic acid and 3459 parts of oleic acid were slowly added with stirring. The temperature was raised to 215° C. after the addition of the acids was complete. Water was collected in a receiving flask. When the water stopped distilling over, vacuum was slowly applied to the system, and more water was distilled over. Full vacuum was then applied for about two hours and samples withdrawn for acid number analysis by titration. The reaction sequence was monitored by InfraRed analysis. Disappearance of the hydroxyl absorbance signalled the end of the reaction.

Four separate lots using this process were produced. The four products had the following acid numbers: 6.97 ("lot 1"), 7.8 ("lot 2"), 8.2 ("lot 3") and 7.05 ("lot 4") respectively.

EXAMPLE 1

A two liter flask was charged with 561 parts of the 6.97 acid number ester (lot 1). 8.4 parts of sodium bicarbonate were added and nitrogen was bubbled through the flask. The reaction temperature was raised to about 160° C. The reaction continued with strong effervescence indicating the release of carbon dioxide. Water droplets were observed in the condenser. To ensure total removal of water, vacuum was slowly applied. The resultant neutralized ester had an acid number of 0.06.

EXAMPLE 2 (comparison)

A two liter flask was charged with 719.2 parts of the 7.8 acid number ester (lot 2). 10 parts of potassium bicarbonate were added and nitrogen was bubbled through the flask. The reaction temperature was raised to about 160° C. The reaction continued with strong effervescence indicating the release of carbon dioxide. After 1½ hours of heating at 160° C., the acid number had changed from 7.8 to 5.5. Further heating at 160° C. resulted in no change in acid number. The reason for this failure is believed to be due to the fact that potassium bicarbonate decomposes upon heating to carbon dioxide, water and potassium carbonate, which is insoluble and hence does not neutralize the acid.

EXAMPLE 3

A two liter flask was charged with 578.4 parts of the 8.2 acid number ester (lot 3). 19.4 parts of cesium bicarbonate were added and nitrogen was bubbled through the flask. The reaction temperature was raised to about 160° C. The reaction continued with strong effervescence indicating the release of carbon dioxide. Water droplets were observed in the condenser. To ensure total removal of water, vacuum was slowly applied. The resultant neutralized ester had an acid number of 1.0.

EXAMPLE 4

A two liter flask was charged with 795 parts of the 7.05 acid number ester (lot 4). 4.1 parts of zinc oxide were added and nitrogen was bubbled through the flask. The reaction temperature was raised to about 200° C. Water droplets were observed in the condenser. To ensure total removal of water, vacuum was slowly applied. The resultant neutralized ester had an acid number of 0.96.

EXAMPLE 5

A two liter flask was charged with about 578 parts of the 8.2 acid number ester (lot 3). 8.4 parts of sodium bicarbonate were added and nitrogen was bubbled through the flask. The reaction temperature was raised to about 160° C. The reaction continued with strong effervescence indicating the release of carbon dioxide. Water droplets were observed in the condenser. To ensure total removal of water, vacuum was slowly applied. The resultant neutralized ester had an acid number of 0.54.

RIM EXAMPLES

In the RIM examples which follow, the following materials were used:

POLYOL A: a 28 OH number polyether prepared by reacting glycerin with a mixture of propylene oxide and ethylene oxide (weight ratio of propylene oxide to ethylene oxide was about 5:1) and having a primary OH group content of about 88%.

DETDA: an 80/20 mixture of 1-methyl-3,5-diethyl-2,4- and 2,6-phenyl diamine.

POLYOL B: a reaction product of ethylene diamine and propylene oxide having an OH number of about 630.

D-400: a 400 molecular weight difunctional aliphatic amine-terminated polyoxypropylene available from Texaco as Jeffamine D-400.

TED: a 33% solution of triethylene diamine in dipropylene glycol.

DMT: dimethyltin dilaurate.

L-5304: a silicone surfactant available from Union Carbide.

ISO: Mondur PF, available from Miles Inc; a liquid isocyanate, having an NCO content of about 23%, prepared by reacting tripropylene glycol with 4,4'-diphenylmethane diisocyanate.

RIM plaques were prepared using a laboratory piston metering unit and clamping unit. The metering unit was a two component instrument having a maximum metering capacity of 0.6 liters. A 300 mm×200 mm×4 mm rectangular mold was used to mold the samples. The mold was first stripped with a mold cleaner (N-methyl pyrolidinone), then soaped with Chemtrend 2006 (available from Chemtrend), and buffed twice. An aluminum transducer plate (5.5 mm radius) was connected to a force transducer mounted in the lid of the mold. The plate was soaked in DMF for an hour, polished with fine steel wool, rinsed with water, and then rinsed with acetone. A RIM shot was then made, and at the appropriate demold time, the lid of the mold was slowly opened. The maximum force required to pull the transducer plate from the molded plaque is the release force. The lower the number, the easier the release. The following molding conditions were used:

| Mold Temperature: | 65° C. |
|---|---|
| Component B Temperature: | 45° C. |
| Component A Temperature: | 45° C. |
| Demold Time: | 45 seconds. |

The formulations used and the results obtained were as set forth in the following table:

| Example | 1 | 2 | 3 | 4 |
|---|---|---|---|---|
| Component B | | | | |
| POLYOL A | 69.1 | 69.1 | 69.1 | 69.1 |
| DETDA | 18.0 | 18.0 | 18.0 | 18.0 |
| POLYOL B | 3.0 | 3.0 | 3.0 | 3.0 |
| D-400 | 3.0 | 3.0 | 3.0 | 3.0 |
| TED | 0.1 | 0.1 | 0.1 | 0.1 |
| DMT | 0.1 | 0.1 | 0.1 | 0.1 |
| L-5304 | 0.7 | 0.7 | 0.7 | 0.7 |
| IMR from | | | | |
| Example 1 | 6.0 | — | — | — |
| Example 3 | — | 6.0 | — | — |
| Example 4 | — | — | 6.0 | — |
| Example 5 | — | — | — | 6.0 |
| Component A | | | | |
| ISO | 55.6 | 55.6 | 55.6 | 55.6 |
| Average release force for 20 consecutive shots | 250 | 600 | 700 | 300 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A novel release agent comprising the reaction product of i) an ester having an acid number of 15 or less, prepared by reacting (a) one mole of a tetrahydroxy compound prepared by reacting one mole of a $C_2$ to $C_8$ alkylene diamine with from 4 to 12 moles of an alkylene oxide, with (b) four moles of an acid mixture consisting of at least one saturated monocarboxylic acid and at least one unsaturated monocarboxylic acid, with the molar ratio of saturated to unsaturated acid being from 1:1 to 3:1, and ii) a neutralizing amount of a neutralizing agent selected from the group consisting of sodium bicarbonate, cesium bicarbonate, and zinc oxide, said reaction product having an acid number of one or less.

2. The composition of claim 1, wherein 1) said ester has an acid number of 10 or less, 2) said alkylene diamine is a $C_2$ or $C_3$ aklylene diamine, 3) from 4 to 6 moles of alkylene oxide are reacted with said diamine, and 4) said molar ratio is 1:1.

3. The composition of claim 1, wherein said alkylene diamine is ethylene diamine.

4. The composition of claim 1, wherein said acids both contain one or more alkyl groups of 4 to 22 carbon atoms.

5. The composition of claim 1, wherein the amount of neutralizing agent used is from 0.1 to 6 parts by weight per one hundred parts by weight of said ester.

6. The composition of claim 5, wherein the amount of neutralizing agent used is form 0.4 to 4 parts by weight per one hundred parts by weight of said ester.

7. An active hydrogen group containing mixture comprising:
   a) one or more compounds having molecular weights of from 400 to 10,000 and containing at least two isocyanate reactive groups,
   b) one or more compounds having molecular weights of 62 to 399 containing at least two isocyanate reactive groups, and
   c) from about 4 to about 12% by weight based upon the amount of components a) and b) of the reaction product of i) an ester having an acid number of 15 or less, prepared by reacting (1) one mole of a tetrahydroxy compound prepared by reacting one mole of a $C_2$ to $C_8$ alkylene diamine with from 4 to 12 moles of an alkylene oxide, with (2) four moles of an acid mixture consisting of at least one saturated monocarboxylic acid and at least one unsaturated monocarboxylic acid, with the molar ratio of saturated to unsaturated acid being from 1:1 to 3:1 and ii) a neutralizing amount of a neutralizing agent selected from the group consisting of sodium bicarbonate, cesium bicarbonate, and zinc oxide, said reaction product having an acid number of one or less.

8. The composition of claim 7, wherein the amount of neutralizing agent used is form 0.1 to 6 parts by weight per one hundred parts by weight of said ester.

9. The composition of claim 8, wherein the amount of neutralizing agent used is form 0.4 to 4 parts by weight per one hundred parts by weight of said ester.

10. In a process for the preparation of a molded product comprising mixing an isocyanate and an active hydrogen containing material to form a reaction mixture, injecting said reaction mixture into a mold via the RIM process, allowing said reaction mixture to fully react to form said molded product, and removing said molded product from said mold, the improvement wherein said reaction mixture contains from about 4 to about 12% by weight based upon the amount of active hydrogen containing material of the reaction product of i) an ester having an acid number of 15 or less, prepared by reacting (1) one mole of a tetrahydroxy compound prepared by reacting one mole of a $C_2$ to $C_8$ alkylene diamine with from 4 to 12 moles of an alkylene oxide, with (2) four moles of an acid mixture consisting of at least one saturated monocarboxylic acid and at least one unsaturated monocarboxylic acid, with the molar ratio of saturated to unsaturated acid being from 1:1 to 3:1 and ii) a neutralizing amount of a neutralizing agent selected from the group consisting of sodium bicarbonate, cesium bicarbonate, and zinc oxide, said reaction product having an acid number of one or less.

* * * * *